May 9, 1961     F. WENNER     2,983,865
MINE DETECTOR
Filed April 1, 1946
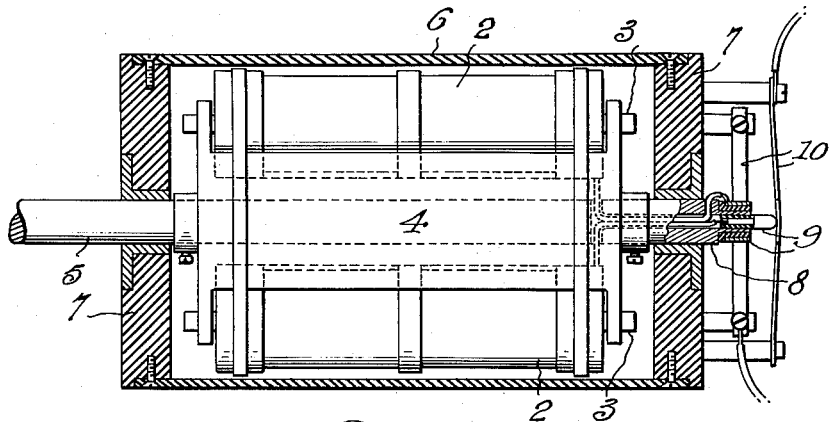
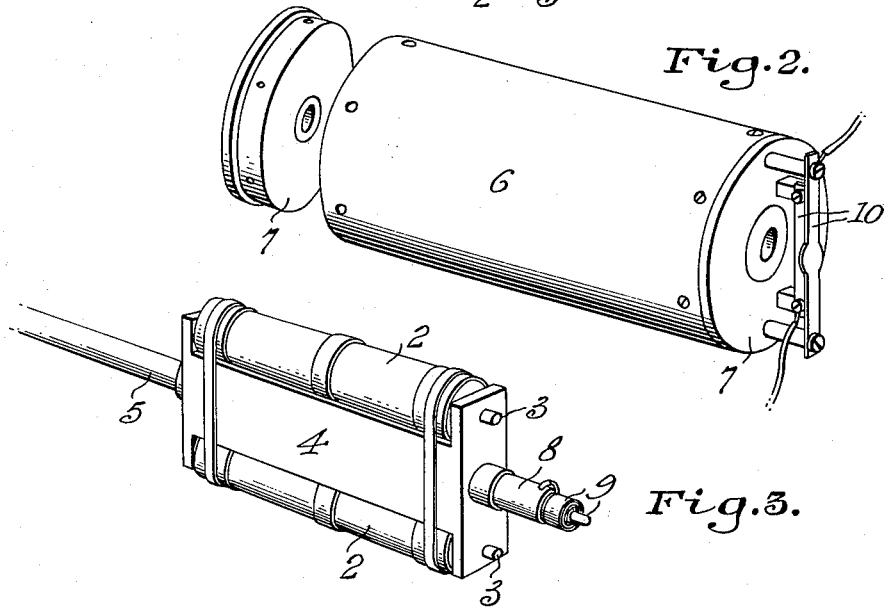
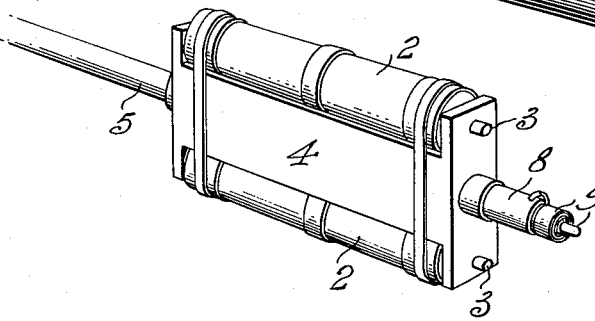
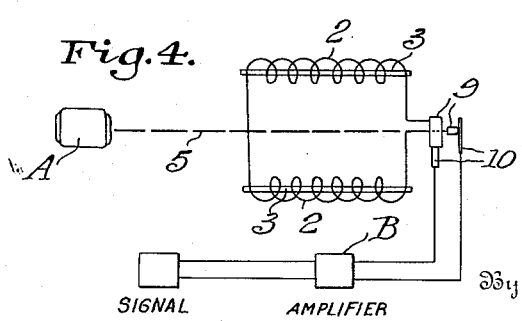
Inventor
Frank Wenner
Attorneys

United States Patent Office 2,983,865
Patented May 9, 1961

2,983,865

MINE DETECTOR

Frank Wenner, Washington, D.C., assignor to the United States of America as represented by the Secretary of War Filed Apr. 1, 1946, Ser. No. 658,611

4 Claims. (Cl. 324—43)

This invention relates to an apparatus for locating hidden objects containing magnetic material, and more particularly to mine detectors.

Mines consisting in part of an iron casing, or other objects containing iron or other material whose magnetic properties differ considerably from those of the surrounding material, cause a distortion of the earth's magnetic field. That is, in the vicinity of the object, the field at some points is larger than normal, while at other points, the field is smaller than normal. Therefore, there are gradients in the field in the vicinity of such mine or other object.

The presence of the mine or other object might be detected by measuring the change in the field as the object is approached or by measuring a component of the gradient of the field in the vicinity of the object. The present invention pertains to a device for detecting or measuring the component of the gradient in a direction perpendicular to a selected direction. It might therefore more properly be called a gradiometer, since it could be used for purposes other than the detection of mines; such as, for example, in geophysical prospecting. The device consists essentially of two rotating coils of insulated wire, an amplifier and signal device. However, it differs radically from other gradiometers using two coils of insulated wire. In the usual type of rotating coil gradiometer the two coils are matched in area turns and mounted with their axes perpendicular to the axis of rotation and definitely parallel to each other. The coils are connected in opposition so that in a uniform field, the electromotive force developed in one coil "bucks" that developed in the other coil. In case of a gradient in the direction of the axis of rotation of that component of the magnetic field which is perpendicular to the axis of rotation, the electromotive force developed in one of the coils will be greater than that developed in the other. That is, the response is to a gradient in the direction of the axis of rotation of that component of the magnetic field which is perpendicular to the axis of rotation, whereas the present invention pertains to a device in which the response is to a gradient in a direction perpendicular to the axis of rotation of that component of the magnetic field which is parallel to the axis of rotation.

More specifically, the invention comprises the features hereinafter fully described and pointed out in the claims. The following description and annexed drawings set forth in detail an illustrative embodiment of the invention, this being indicative of but one of a number of ways in which the principles of the invention may be successfully employed.

In the drawings:

Figure 1 is an elevational view of a portion of the apparatus of the invention, certain details being shown in section;

Figure 2 is a perspective of the portion shown in Figure 1;

Figure 3 is a perspective of a rotatable frame which will be referred to in detail; and Figure 4 is a wiring diagrammatically illustrating all of the elements of the apparatus.

Referring more particularly to the drawings, the apparatus of the invention comprises two coils 2 of insulated wire, having either air or highly permeable cores 3, such as "Permalloy," the said cores being arranged in parallelism and rigidly fixed to a block 4; and the coils are arranged for rotation on a shaft 5 which is connected to the block 4 midway between, and parallel to their axes. Thus, the axes of the coils and the axis of rotation remain parallel during rotation. The requisite rotation of the coils may be produced in any suitable manner, as by a motor A; or if desired by the manual manipulation of the operator.

The coil assembly is mounted in a tubular housing 6 having end plates 7 which form bearings for the shaft 5. The shaft 5 has an extension 8 which carries slip rings 9, the latter being electrically insulated from each other. These slip rings 9 connect with the adjacent ends of the coils 2. Brushes 10 on the end plate supporting the slip rings provide external contacts therefor.

The arrangement is such that when adjustments are properly made, the primary motion of each coil is in a direction perpendicular to its axis. Consequently, if the magnetic field is uniform, no electromotive force is developed in either coil as a result of this motion. However, if there is a gradient in a direction perpenicular to the axis of rotation of that component of the field which is parallel to the axis of rotation, an electromotive force is developed in each of the coils.

However, in use, since the instrument is portable, there are secondary motions resulting in changes in the direction of the axis of the coils. These secondary motions result in the development of an electromotive force in each of the coils, whether or not the field is uniform. The two coils are so matched and so aligned relative to each other that in a uniform field the two electromotive forces are at each instant equal.

These two coils are connected in series in such a way that the electromotive force resulting from the primary motions are in phase, that is, are additive; while those components resulting from secondary motions are one-half cycle out of phase, that is, neutralize each other. Except for the secondary motions it would not be necessary to use more than one coil.

The alternating electromotive force developed in the coils is impressed on a suitable amplifier B so that a signal may be indicated visually or audibly in the manner well known in the arts of signals and indicators.

Having thus described my invention, what I claim as new and wish to secure by Letters Patent is:

1. Apparatus for detecting magnetic material comprising a non-magnetic frame, a pair of spaced parallel cores of magnetically permeable material mounted in said frame, a coil wound on each of said cores and electrically connected in series, said frame being rotatable about an axis which is parallel to and midway between the axes of said coils, an amplifier connected to said coils, and signalling means associated with said amplifier.

2. Apparatus for detecting magnetic material comprising a non-magnetic frame, a pair of spaced parallel cores of magnetically permable material mounted in said frame, a coil wound on each of said cores and electrically connected in series, said frame being rotatable about an axis which is parallel to and midway between the axes of said coils, an amplifier, slip rings mounted on said frame, said slip rings being electrically connected to said coils and to said amplifier, and signalling means associated with said amplifier.

3. Apparatus for detecting magnetic material comprising a non-magnetic frame, a pair of spaced parallel cores of magnetically permeable material mounted in said frame, a coil wound on each of said cores and electrically connected in series, a housing enclosing said frame and said coils, a shaft carried by and projecting from said frame parallel to and midway between the axes of said coils, said shaft and said coils being rotatably mounted for unitary rotation in said housing, slip rings mounted on said frame, said slip rings being electrically connected to said coils and disposed coaxially of said shaft, an amplifier, collecting brushes electrically connecting said slip rings and said amplifier, said collecting brushes being mounted on said housing, and signalling means associated with said amplifier.

4. Apparatus for detecting and measuring a magnetic field gradient in a direction perpendicular to a selected direction, comprising a pair of matched coils of wire mounted with their axes parallel, a core of highly magnetic permeable material in each of the coils, the said coils being mounted in spaced, axially parallel relation, and arranged for rotation and being connected in electrical series so that the electromotive forces resulting from the uniform component of the field are out of phase and neutralize each other while those resulting from a gradient of the field in a direction perpendicular to the axis of rotation of that component of the magnetic field which is parallel to the axis of rotation of the coil are in phase and are additive, an amplifier and a signalling indicator, the amplifier and signalling indicator being in series electrical circuit with each other and with the said coils.

References Cited in the file of this patent

UNITED STATES PATENTS

| | | |
|---|---|---|
| 58,960 | Berlioz | Oct. 16, 1866 |
| 168,018 | Heikel | Sept. 21, 1875 |
| 1,859,005 | Ricker | May 17, 1932 |
| 2,099,972 | Dalen et al. | Nov. 23, 1937 |
| 2,246,542 | Smith | June 24, 1941 |
| 2,291,692 | Cloud | Aug. 4, 1942 |
| 2,359,894 | Brown et al. | Oct. 10, 1944 |